United States Patent
Staempfle et al.

(10) Patent No.: US 8,630,762 B2
(45) Date of Patent: Jan. 14, 2014

(54) METHOD FOR THE CALCULATION OF A COLLISION-PREVENTING TRAJECTORY FOR A DRIVING MANEUVER OF A VEHICLE

(75) Inventors: Martin Staempfle, Schwieberdingen (DE); Christian Schmidt, Stuttgart (DE); Wolfgang Branz, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 685 days.

(21) Appl. No.: 12/308,636

(22) PCT Filed: Jan. 31, 2008

(86) PCT No.: PCT/EP2008/051168
§ 371 (c)(1),
(2), (4) Date: Dec. 30, 2010

(87) PCT Pub. No.: WO2008/113636
PCT Pub. Date: Sep. 25, 2008

(65) Prior Publication Data
US 2011/0106361 A1 May 5, 2011

(30) Foreign Application Priority Data
Mar. 16, 2007 (DE) .......................... 10 2007 013 303

(51) Int. Cl.
*G01C 22/00* (2006.01)

(52) U.S. Cl.
USPC ............................. 701/23; 340/436; 340/901

(58) Field of Classification Search
USPC ................. 701/301, 1, 300, 23; 340/436, 901
See application file for complete search history.

(56) References Cited

U.S. PATENT DOCUMENTS

| 6,926,374 B2 * | 8/2005 | Dudeck et al. ................ 303/191 |
| 2004/0093160 A1 * | 5/2004 | Knoop et al. ................ 701/301 |
| 2004/0236491 A1 | 11/2004 | Seto |
| 2005/0192749 A1 | 9/2005 | Flann et al. |

FOREIGN PATENT DOCUMENTS

| DE | 42 07 001 | 9/1992 |
| DE | 10 2004 056120 | 5/2006 |
| DE | 00 2006 024204 | 6/2007 |
| DE | 10 2006 016185 | 10/2007 |
| JP | 2004-504216 | 2/2004 |
| WO | WO 2006/070865 | 7/2006 |
| WO | WO 2006/097467 | 9/2006 |

\* cited by examiner

*Primary Examiner* — Thomas Black
*Assistant Examiner* — Luke Huynh
(74) *Attorney, Agent, or Firm* — Kenyon & Kenyon LLP (57) ABSTRACT

A method for calculating a collision-avoiding trajectory for a driving maneuver of a vehicle, in particular a motor vehicle, in order to evade at least one obstacle approaching the motor vehicle during driving operation. The lateral speed of the motor vehicle is taken into account in the calculation independently of the longitudinal speed of the motor vehicle.

17 Claims, 4 Drawing Sheets

METHOD FOR THE CALCULATION OF A COLLISION-PREVENTING TRAJECTORY FOR A DRIVING MANEUVER OF A VEHICLE

FIELD OF THE INVENTION

The present invention relates to a method for calculating a collision-avoiding trajectory for a driving maneuver of a vehicle. The invention likewise relates to a method for collision avoidance for a vehicle. The invention further relates to a computer program, a computer program product, and an apparatus for executing or carrying out such methods.

BACKGROUND INFORMATION

German patent document DE 10 2004 056 120 A1 relates to a method for collision avoidance or collision consequence mitigation during a driving operation in which a motor vehicle approaches an obstacle, in particular a preceding vehicle; in one method, at least the relative speed between the motor vehicle and the obstacle is ascertained; a remaining time span until the latest onset of a collision-avoiding evasive maneuver, constituting an evasion time span, is ascertained; and a collision-avoiding or collision-consequence-mitigating action is taken as a function of the evasion time span that has been ascertained.

A variety of methods for trajectory planning are known in particular from robotics, on the basis of which methods a robot can be moved in collision-free fashion through a set of obstacles. These can refer to both a manipulator and a vehicle. The motion can occur in a two- or three-dimensional space.

Methods that take into account only stationary obstacles are known from practical use. Further methods are capable of also incorporating movable obstacles. The so-called "road maps" method connects all the vertices of the sensed obstacles to one another and thereby constructs a graph over all possible paths. Based on this graph, a route through an environment having obstacles can then be calculated. A procedure of this kind is discussed, for example, in US 2005/0192749 A1. There are also methods that subdivide the overall environment into collision-free and colliding cells, and connect a selection of collision-free cells into a collision-free route through existing obstacles. Such methods are, however, suitable only for stationary obstacles.

Methods based on virtual forces allocated to the obstacles also exist. If all the obstacles possess a repelling effect on the robot, and only the destination point has an attractive effect, it is possible to construct a potential field (similar to an electric field) through which a path through the obstacles can be calculated on the basis of the cumulative total force proportional to the gradient of the field. This principle is independent of whether the obstacles are or are not moving, since the path is determined only from the resulting total force of the field at the particular current point in time. Such methods can thus be used to the same extent for moving and non-moving obstacles. The robot guidance apparatus discussed in DE 42 07 001 A1 uses a resistance lattice having nodes, each of which represents an individual and discrete position within a travelable environment, and having connections between the nodes. Connections between nodes with an open circuit result in errors when the robot attempts to move along a travelable path, and can result in collisions with obstacles within the travelable environment.

SUMMARY OF THE INVENTION

The method according to the present invention for calculating a collision-avoiding or collision-consequence-mitigating trajectory for a driving maneuver of a vehicle, in particular a motor vehicle, in order to evade at least one obstacle approaching the motor vehicle during driving operation, the lateral speed of the motor vehicle being taken into account in the calculation independently of the longitudinal speed of the motor vehicle, enables a very effective, simple, and fast trajectory calculation for vehicles, in particular motor vehicles or vehicle-like mobile robots, for scenarios typical of traffic. The method according to the present invention is suitable in particular for traffic scenarios in which much higher speeds typically prevail in a longitudinal than in a lateral direction. It is thereby advantageously possible to reduce trajectory planning to a calculation of the lateral position for a known longitudinal position that results from the longitudinal speed (which can be assumed to be known). The originally two-dimensional route planning can thus be reduced by one dimension, resulting in considerable simplification and thus in a faster calculation.

In accordance therewith, a method is proposed which can calculate a trajectory for the own vehicle in two-dimensional space for stationary and moving obstacles, and which is suitable for scenarios and obstacle constellations of typical road traffic. The dimensional limitation allows the trajectory to be calculated easily and very effectively, although in principle an expansion to a further dimension is conceivable. The assumption of a lateral speed that is relatively small in relation to the longitudinal speed allows the longitudinal and transverse kinematics to be decoupled to a good approximation. It is thus relatively simple to find a trajectory that leads past potential obstacles in collision-free fashion. This can be achieved by the fact that the passing locations and times are determined on the basis of the known longitudinal speed of the vehicle, and the possible attainable lateral positions at those locations are calculated.

Described herein is a method for collision avoidance for a vehicle, in particular a motor vehicle.

A computer program having a program code arrangement, and a computer program product having program code arrangement that is stored on a computer-readable data medium, in order to execute the methods according to the present invention, are also described herein.

Also described herein is an apparatus, in particular to a driver assistance system of a vehicle, in particular a motor vehicle, for carrying out the method according to the present invention.

The method according to the present invention for calculating a collision-avoiding trajectory for a driving maneuver of a vehicle, or the method according to the present invention for collision avoidance for a vehicle, in particular a motor vehicle, may be implemented as a computer program on a control device of a driver assistance system of a vehicle, in particular a motor vehicle, although others solutions are of course possible. For this purpose, the computer program is stored in a memory element of the control device. The method is carried out by execution on a microprocessor of the control device. The computer program can be stored as a computer program product on a computer-readable data medium (diskette, CD, DVD, hard drive, USB memory stick, memory card, or the like) or on an Internet server, and can be transferred from there into the memory element of the control device.

Advantageous embodiments and refinements of the invention are evident from the dependent claims. An exemplifying embodiment of the invention is explained in principle below with reference to the drawings.

DETAILED DESCRIPTION

A method according to the present invention for calculating a collision-avoiding trajectory 13 (see FIG. 6) for a driving maneuver of a vehicle is described below with reference to a motor vehicle 1 (see FIG. 1). In further exemplifying embodiments (not depicted), other vehicles such as, for example, vehicle-like mobile robots or the like could of course also be equipped—with corresponding modifications—with an implementation of the method according to the present invention.

Figure 1:
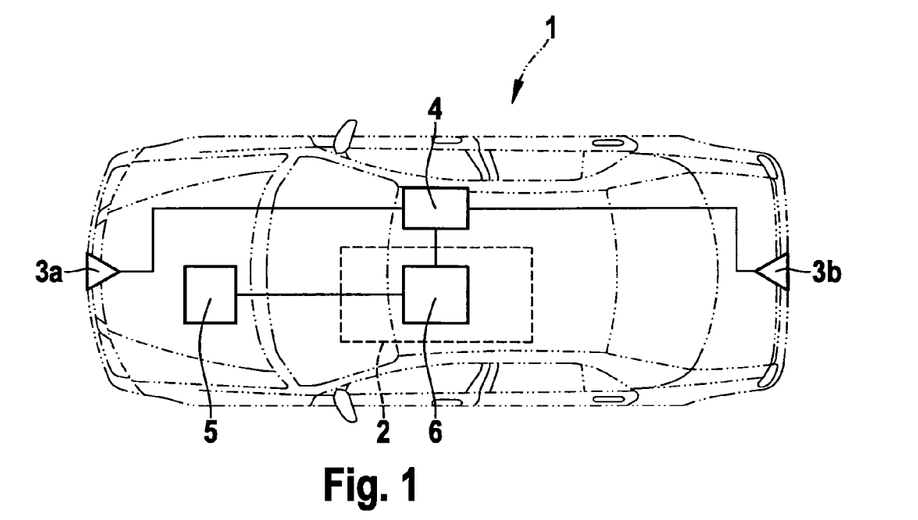
FIG. 1 shows a highly simplified schematic depiction of a motor vehicle in which a method according to the present invention is implemented.

FIG. 1 depicts motor vehicle 1 on which the method according to the present invention, for calculating a collision-avoiding trajectory 13 for a driving maneuver of motor vehicle 1 in order to evade at least one obstacle 11 (see FIG. 5) approaching motor vehicle 1 during driving operation, is implemented. Based thereon, an apparatus, embodied as a driver assistance system 2, for carrying out the method according to the present invention can assist the driver in evading obstacles 11, and in the event of an imminent collision can guide him or her, autonomously or semiautonomously, onto a safe trajectory 13 that does not collide with any obstacle 11 surrounding the own motor vehicle 1. This can be accomplished on the one hand by displaying a corresponding warning, or on the other hand by an active intervention by driver assistance system 2 by way of a correcting brake intervention via a controlled increase in braking force, or by way of a corresponding steering intervention via a steering system (not depicted) of motor vehicle 1. Motor vehicle 1 has a sensing device 3a for instrumental sensing of the traffic situation in front of motor vehicle 1, and a sensing device 3b for sensing the traffic situation behind motor vehicle 1. Sensing devices 3a, 3b can be embodied as an environment-sensing sensor apparatus, for example as a radar, camera, laser scanner, or the like.

Sensing devices 3a, 3b are connected to an evaluation device 4 with which, on the basis of the sensor signals of sensing devices 3a, 3b, variables such as the distance, speed, or acceleration of preceding or following objects or obstacles 11 can be ascertained and tracked. Motor vehicle 1 furthermore has an arrangement 5 for ascertaining vehicle data of motor vehicle 1, for example the own-vehicle speed, own-vehicle acceleration, assumed coefficient of friction of the road, brake actuation, steering wheel actuation, and steering angle. An arrangement 5 can also be provided in other vehicle systems that are not depicted, for example in an electronic stability program (ESP) or a steering system. A control device 6 is electronically connected via evaluation device 4 to sensing devices 3a, 3b, and through the connection receives data concerning preceding and following obstacles 11. Control device 6 is furthermore electronically connected to an arrangement 5 for ascertaining vehicle data, i.e. control device 6 receives the corresponding vehicle data from an arrangement 5 or, via a CAN bus of motor vehicle 1, from other vehicle systems, in particular vehicle dynamics systems (not depicted). In the context of driver assistance system 2, the method according to the present invention for collision avoidance for motor vehicle 1 then executes on control device 6, in which method, in the context of an obstacle 11 approaching during driving operation, a driving maneuver of motor vehicle 1 for evasion is carried out autonomously or semiautonomously, or is proposed via a warning device to the driver or to further vehicle systems. The driving maneuver is in turn based on trajectory 13 ascertained by the calculation method according to the present invention, the lateral speed $v_y$ of motor vehicle 1 being taken into account in the calculation independently of the longitudinal speed of motor vehicle 1. As a result of the decoupling of the lengthwise and transverse speeds, or of longitudinal and lateral speeds $v_x$ and $v_y$, a lateral offset $\Delta y$ can be described by the following equation (a) for a time interval $\Delta t$:

$$\Delta y = v_y \Delta t + \tfrac{1}{2} a_y \Delta t^2 \qquad (a)$$

In order to calculate the maximum attainable lateral position $\Delta y$ at the next obstacle 11, on the one hand the maximum acceleration $a_y$ must be assumed, but on the other hand the speed $v_y$ at the previous obstacle 11 must also be incorporated. The one-dimensional kinematic equations for the lateral position y and lateral speed $v_y$ for a time interval $\Delta t$ ($y_0$ and $v_0$ referring to the lateral position and lateral speed at the beginning of the calculation, i.e. to the respective starting points) are:

$$y = y_0 + v_0 \Delta t + \tfrac{1}{2} a_y \Delta t^2 \qquad (b)$$

$$v_y = v_0 + a_y \Delta t \qquad (c)$$

Placing equations (b) and (c) inside one another, and eliminating the time dependence, yields the following dependence (d) of speed $v_y$ on position y:

$$v_y = \pm \sqrt{v_0^2 + 2 a_y (y - y_0)} \qquad (d)$$

Figure 2:
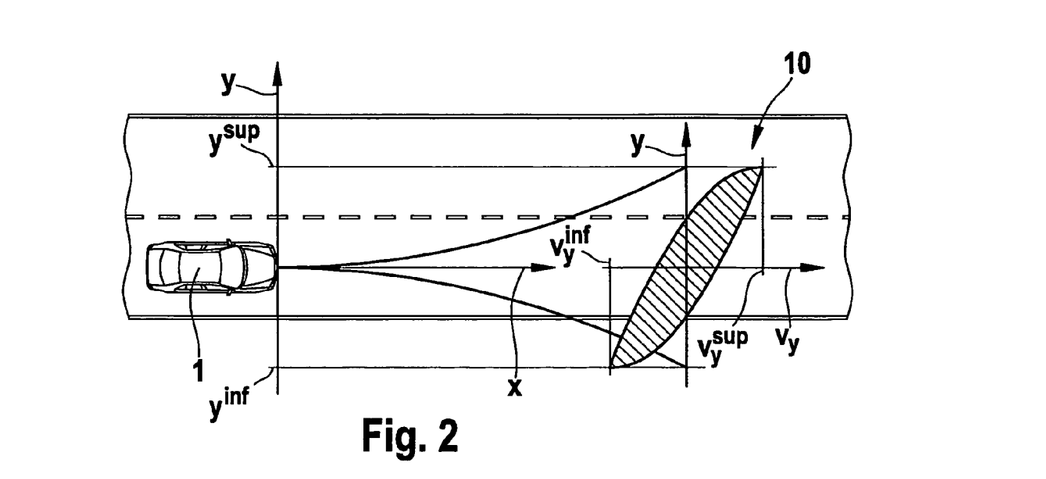
FIG. 2 shows a simplified schematic depiction of a dependence of the lateral speed $v_y$ on the lateral position y of a motor vehicle.
Figure 3:
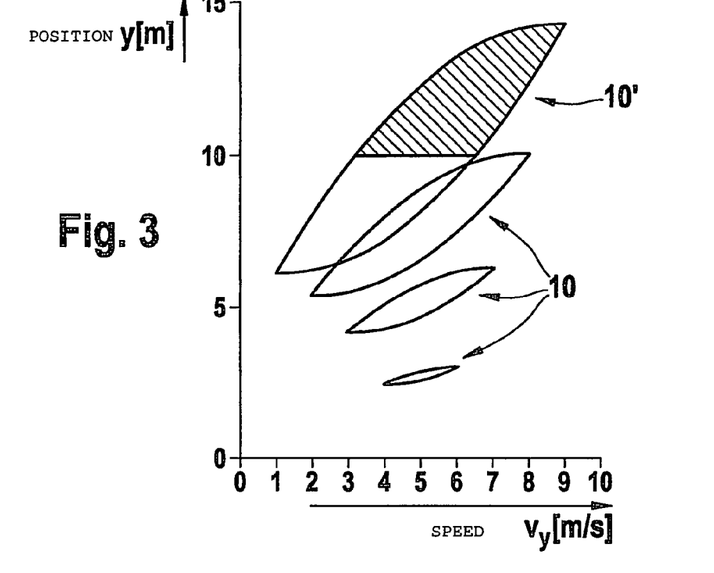
FIG. 3 shows a simplified diagram of a propagation of a lateral speed $v_y$ as a function of the lateral position y of a motor vehicle.

It is thereby possible to calculate, for each lateral position $y_i$ of motor vehicle 1, the maximum and minimum lateral speed $v_y^{sup}$, $v_y^{inf}$. This is illustrated in FIG. 2 for motor vehicle 1. This yields areas 10, 10', as depicted by way of example in FIG. 3, for a propagation in the context of a starting speed $v_y = 5$ m/s and a maximum acceleration $a_y = 0.2$ G (G=9.81 m/s$^2$) for the period t=0 to 2.5 s. In FIG. 3, lateral position y is plotted on the vertical axis, and lateral speed $v_y$ on the horizontal axis. Based on these diagrams or areas 10, 10' it is now possible to ascertain, for each passing point i or each longitudinal position $x_i$ at obstacle 11, the maximum and minimum attainable positions $y_i^{sup}$, $y_i^{inf}$ as a position range i ($y_i^{inf}$, $y_i^{sup}$), i.e. a respective associated attainable lateral position range ($y_i^{inf}$, $y_i^{sup}$) of motor vehicle 1 is calculated for the longitudinal positions $x_i$ of motor vehicle 1.

Figure 4:
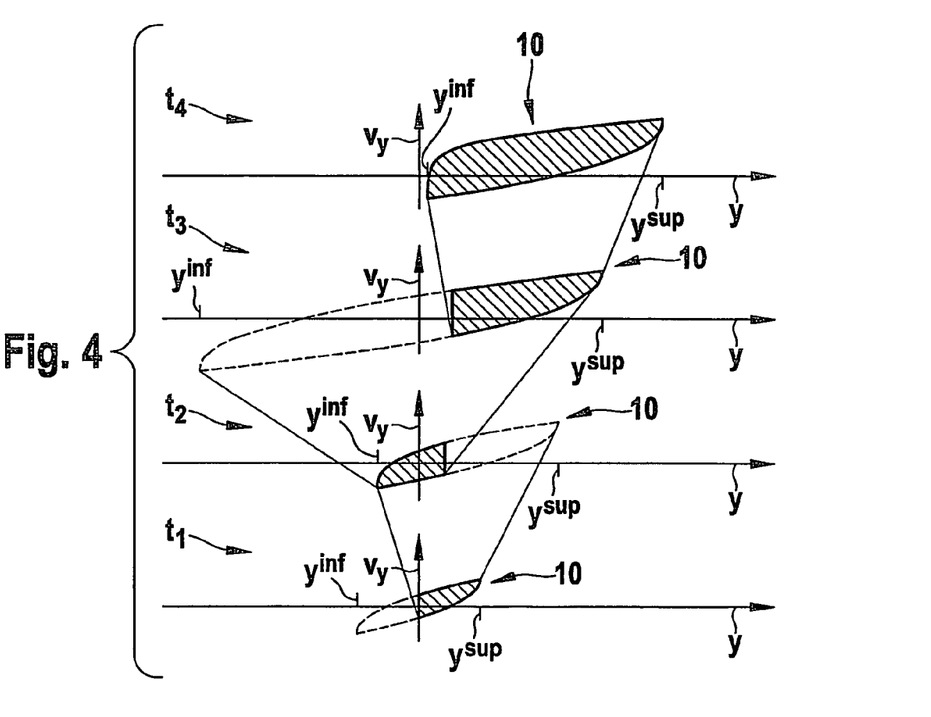
FIG. 4 shows a simplified schematic depiction of a development of the attainable lateral positions y for a motor vehicle after repeated bounding by obstacles.

If the own motor vehicle 1 is confined by obstacles 11 (see FIG. 5) or by a road edge, areas 10, 10' are bounded or cut off by the fact that the upper or lower tip is detached at the relevant y position, as indicated in FIG. 3 by the partly cross-hatched area 10' for the last propagation depicted. In this motor vehicle 1 must not be offset laterally more than +10 m out from the zero line at longitudinal position $x_i$, since otherwise it would collide with an obstacle 11. Propagation must then be continued only with this cut-off area 10', which in this case extends from $y^{inf}=6$ m to $y^{sup}=10$ m. Upon further propagation, the cut-off y-$v_y$ diagrams once again develop substantially in accordance with equation (d), i.e. further calculation of the attainable maximum and minimum lateral positions $y^{sup}$, $y^{inf}$ can be accomplished analogously. The subsequent attainable positions can therefore be determined very effectively despite repeated bounding of the travelable regions by various obstacles 11. It is particularly advantageous that the propagation increment $\Delta t$ can be varied, so that the maximum and minimum lateral speed $v_y^{sup}$, $v_y^{inf}$ upon arrival at the next obstacle 11 can be calculated immediately. At the level of obstacle 11, based on the maximum and minimum lateral position $y^{sup}$, $y^{inf}$ it is possible to define a passing gate for passing, which gate on the one hand is in fact attainable by motor vehicle 1 and on the other hand is definitely collision-free. FIG. 4 illustrates this method with an exemplifying propagation sequence. Indicated for each of the four points in time $t_1$ to $t_4$ are the respective attainable lateral positions $y^{sup}$, $y^{inf}$ that were subsequently laterally bounded or cut off by the blocked areas or blocking regions 12, depicted in FIG. 5, of obstacles 11. The attainable lateral positions $y^{sup}$, $y^{inf}$ can be read off, the respective passing gate that must be traveled through being indicated with crosshatching. The distances in the longitudinal direction between the passing gates are not depicted in FIG. 4 because of the orthogonal breakdown, and are required only in the form of times $t_1$ to $t_4$.

Figure 5:
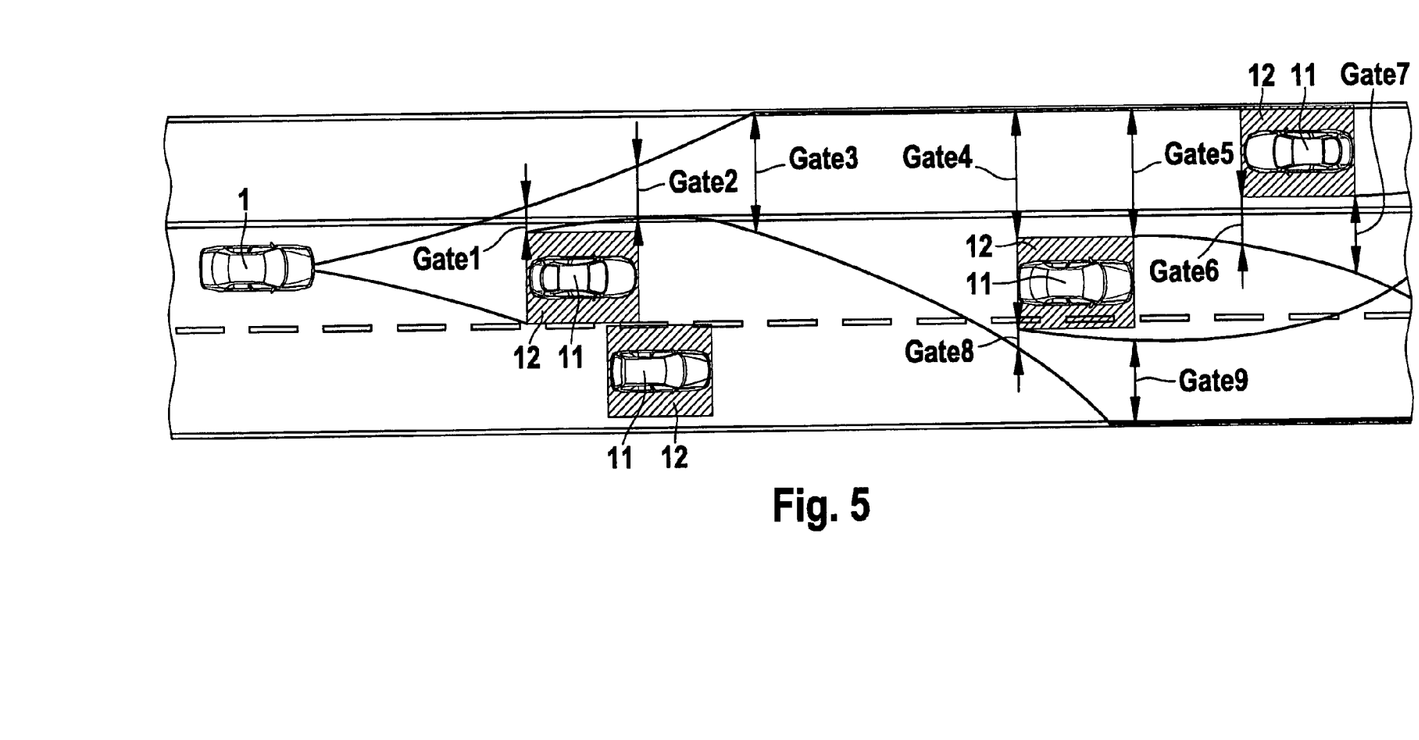
FIG. 5 shows a simplified depiction of blocking regions and passing gates within the method according to the present invention.

FIG. 5 shows a sample scenario with a motor vehicle 1 and four obstacles 11. Blocking regions 12, which would result in a collision because of a simultaneous positional superposition of motor vehicle 1 and obstacle 11 and which therefore must not be traveled in by motor vehicle 1, are defined In a space surrounding motor vehicle 1 on the basis of the longitudinal motion of motor vehicle 1 and the lateral position of the corresponding obstacle 11. Blocking regions 12 are equipped with additional safety regions (not depicted) that take into account the geometry of motor vehicle 1 and its possible rotation in the context of a yaw angle conditioned by travel along collision-avoiding trajectory 13. What results accordingly, in consideration of the geometry of motor vehicle 1, is a blocked area or blocking region 12 around each obstacle 11, which region inevitably leads to a collision when entered by motor vehicle 1. The lateral position y of motor vehicle 1 (the own vehicle) is limited on the basis of said blocking regions 12, thus resulting in passing gates Gate1 to Gate9 that can be attained and traveled through by motor vehicle 1 and that therefore convey motor vehicle 1 in collision-free fashion past obstacles 11. The attainable lateral position ranges $y_i^{inf}$, $y_i^{sup}$ are thus cut off and/or bounded by the respective blocking regions 12 of obstacles 11, thus yielding passing gates Gate1 to Gate9.

In the context of the method according to the present invention, an accelerated motion of motor vehicle 1 and/or of obstacles 11 can also be taken into account in the calculation of collision-avoiding trajectory 13.

The dimensions and position of each blocking region 12 are obtained from the first contact point $x_i$ in the longitudinal direction—for example, in the case of a preceding vehicle as obstacle 11, the point at which the front edge of motor vehicle 1 touches the back of the preceding obstacle 11—and from the last contact point, which is then determined by contact between the front bumper of obstacle 11 and the rear bumper of motor vehicle 1 if motor vehicle 1 could virtually "drive through" obstacle 11. For simplicity, rotation of the geometries in blocking region 12 can be taken into account, for different yaw angles, by incorporating the first and the last contact point, and the maximum and the minimum lateral extension, independently of one another, so that blocking region 12 is defined by the surrounding bounding contour or "bounding box." Assuming, in the simplest case, an unaccelerated motion of motor vehicle 1 and of obstacles 11, the first and last contact time and contact point can then be calculated from the following kinematic equations:

$$x_{motor\ vehicle}=v_0 t \tag{e}$$

$$x_{obstacle}=x_0+v_{obstacle}t \tag{f}$$

$$t_{contact}=x_0/(v_0-v_{obstacle}) \tag{g}$$

$$x_{contact}=(v_0 x_0)/(v_0-v_{obstacle}) \tag{h}$$

Equations (e) to (h) become correspondingly more complex and more detailed for the case of an accelerated motor vehicle 1 and/or obstacle vehicle 11; also possible is an acceleration range in which the equations must be respectively set up for the worst-case constellations, so that the extension of blocking regions 12 becomes maximal. There is, however, no resulting change in the principle of calculating blocking regions 12 by way of the first and the last contact point.

As is evident from FIG. 5, in the simplest case all obstacles 11 are non-moving, so that blocking regions 12 result immediately from the position of obstacle 11 at time t=0. If the lateral position of obstacle 11 at the first and the last contact time is then considered, and if the geometry of motor vehicle 1 is taken into account using an additional safety region, blocking region 12 for each obstacle 11 can be indicated directly from these coordinates. A corresponding avoidance path must be laid out around all the blocking regions 12.

In the case of a curved road, by projecting the curved road surface into a straight line it is moreover possible to apply the same method for calculating blocking regions 12, and thus to calculate a path for the curved track as well.

Based on blocking regions 12, it is now possible to calculate the maximum and minimum attainable lateral offset $\Delta y$ from obstacles 11 based on the speed propagation shown in FIG. 3, since the diagram supplies the attainable passing gates Gate1 to Gate9 by way of the maximum and minimum laterally attainable positions $y^{sup}$ and $y^{inf}$, so that a possible avoidance path passes through a specific passing-gate sequence.

An obstacle 11 can be passed on both the right and the left; if n obstacles 11 are present, this yields a maximum of $2^n$ possible evasion paths. As is evident from FIG. 5, however, in this particular application the blocking regions 12 limit the possible collision-free paths to only two rather than the maximum of $2^4=16$ evasion paths, those being marked by the passing-gate sequences Gate1-Gate2-Gate3-Gate4-Gate5-Gate6-Gate7 and Gate1-Gate2-Gate3-Gate8-Gate9.

A collision-free evasion trajectory can now be calculated by way of an optimization method for a sequence of passing gates Gate1 to Gate9, i.e. a collision-avoiding trajectory 13 that passes through lateral position ranges $y^{inf}$, $y^{sup}$ or passing gates Gate1 to Gate9, the upper bound $y_i^{sup}$ and lower bound $y_i^{inf}$ of the lateral position range i ($y_i^{sup}$, $y_i^{inf}$) being accounted for in the optimization method as a boundary condition. For example, under the boundary condition that for passing gate Gate(i) at position $x_i$, trajectory 13 must be less than or equal to upper gate bound $y_i^{sup}$ and greater than or equal to lower gate bound $y_i^{inf}$, it is possible to calculate, for example, a constant-curvature spline that passes through interpolation points ($x_i$, $y_i$) for i=1 to n passing gates Gate1 to Gate9. Collision-avoiding trajectory 13 is consequently described by the constant-curvature spline. In further exemplifying embodiments, collision-avoiding trajectory 13 could also be described by a polyline having equidistant interpolation points.

An optimization criterion that can be utilized to calculate the as-yet unknown interpolation points $(x_i, y_i)$ for the constant-curvature spline is, for example, minimization of the integral over the square of the curvature $\kappa(s)$ over the entire length l of trajectory 13:

$$F = \int_{s=0}^{l} \kappa(s)^2 \, ds = \min! \quad (i)$$

Boundary condition: $\forall y_i(x_i): y_i^{inf}(x_i) \leq y_i(x_i) \leq y_i^{sup}(x_i)$ The description of trajectory 13 using a spline arrangement that the integral can be solved analytically, and the optimization criterion can be indicated directly as a function of the parameters of the splines. The profile of trajectory 13 within interval i is described by a third-order polynomial:

$$y^i(x) = p_0^i + p_1^i x + p_2^i x^2 + p_3^i x^3 \quad (j)$$

If curvature $\kappa$ within interval i is set—as a very good approximation, given the typically elongated profile of evasion trajectory 13—to equal the second-order derivative $y^{i\prime\prime}(x)$, the optimization criterion that then follows from the parameters of spline polynomial $p_0^i$ to $p_3^i$ is:

$$F = \int_{s=0}^{l} \kappa(s)^2 \, ds \approx \int_{x=0}^{x} y''(x) \, dx \quad (k)$$
$$= 4 \sum_{i=0}^{n-1} p_2^{i\,2}(x_{i+1} - x_i) + 3 p_2^i p_3^i (x_{i+1} - x_i)^2 + 3 p_3^{i\,2}(x_{i+1} - x_i)^3$$

Any other desired optimization method and optimization criteria derived therefrom can, however, also be used. Also conceivable, for example, is a minimization of the maximum lateral acceleration that occurs, or weighted combinations of the two criteria.

Figure 6:
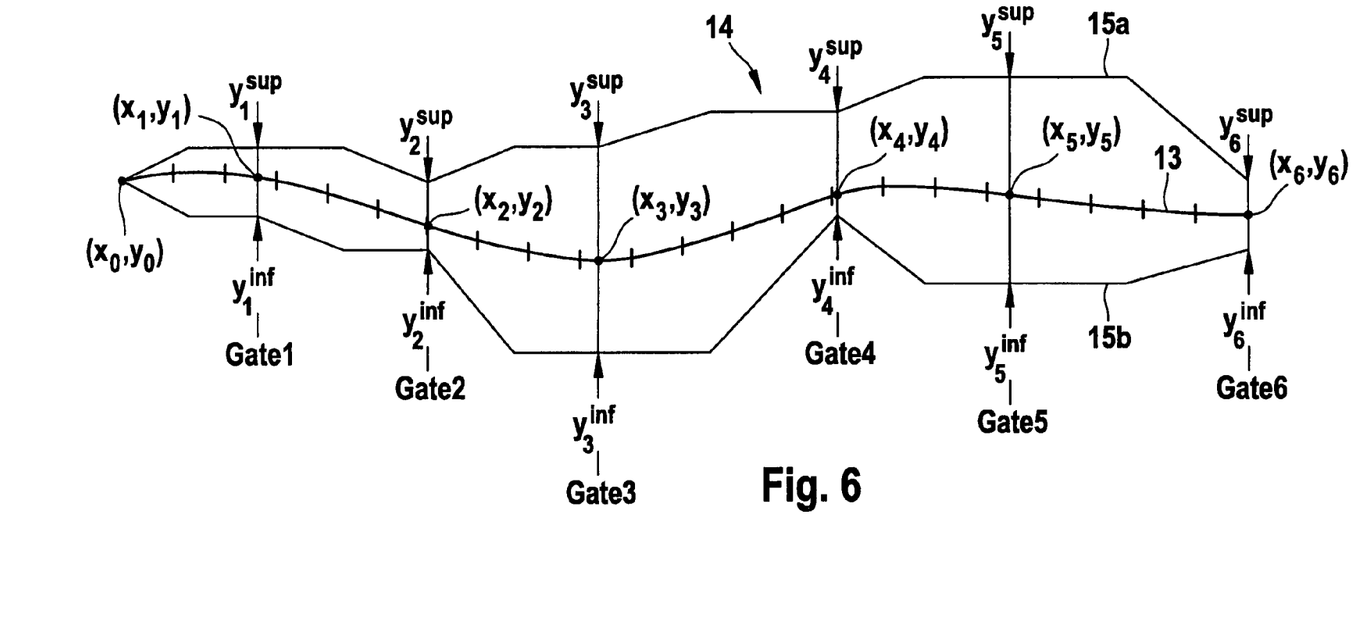
FIG. 6 shows a driving track with interpolation points, for description of a collision-avoiding trajectory.

As depicted in FIG. 6, collision-avoiding trajectory 13 can also be described by interpolation points at equidistant spacings. A driving track 14, whose edges 15a, 15b bound evasion trajectory 13 at the top and bottom, is thereby defined through passing gates Gate1 to Gate6. The polyline resulting therefrom must minimize the above optimization criterion, or if applicable an alternative one. What is described in accordance therewith is the possible collision-avoiding trajectory 13 through passing gates Gate1 to Gate6 that is attainable by motor vehicle 1 in accordance with its predetermined vehicle-dynamics properties, and that leads in collision-free fashion past obstacles 11.

Advantageously, the method for collision avoidance for motor vehicle 1 can then be operated on motor vehicle 1, in which method, in the context of an obstacle 11 approaching during driving operation, a driving maneuver of motor vehicle 1 for evasion is autonomously or semiautonomously carried out or proposed, the driving maneuver being based on collision-avoiding trajectory 13.

What is claimed is:

1. A method for evading at least one obstacle approaching a motor vehicle by maneuvering the motor vehicle, the method comprising:
   determining, by a processor of a vehicle control device, a collision-avoiding trajectory for the driving maneuver of the motor vehicle, so as to evade the at least one obstacle approaching the motor vehicle during a driving operation;
   wherein the determining includes, for each of a plurality of longitudinal distances from the vehicle, calculating an associated attainable lateral position range of the motor vehicle by taking the lateral speed of the motor vehicle into account independently of a longitudinal speed of the motor vehicle, and
   wherein the attainable lateral position range is at least one of cut off and bounded by a blocking region of the at least one obstacle, so as to result in a passing gate.

2. The method of claim 1, wherein blocking regions, which must not be traveled in by the motor vehicle because of a very high probability of collision with the obstacle, are defined in a space surrounding the motor vehicle on the basis of a longitudinal motion of the motor vehicle and a lateral position of the at least one obstacle.

3. The method of claim 1, wherein by way of the passing gates, a possible collision-avoiding trajectory is described which is attainable by the motor vehicle in accordance with its predetermined vehicle-dynamics properties, and which leads in collision-free fashion past the at least one obstacle.

4. The method of claim 3, wherein the collision-avoiding trajectory that leads through the passing gates is calculated with the aid of an optimization process, an upper bound and a lower bound of the lateral position range being taken into account in the optimization as a boundary condition.

5. The method of claim 1, wherein an accelerated motion of at least one of the motor vehicle and of the at least one obstacle is taken into account in determining the collision-avoiding trajectory.

6. A method for evading at least one obstacle approaching a motor vehicle by maneuvering the motor vehicle, the method comprising:
   determining, by a processor of a vehicle control device, a collision-avoiding trajectory for the driving maneuver of the motor vehicle, so as to evade the at least one obstacle approaching the motor vehicle during a driving operation;
   wherein the lateral speed of the motor vehicle is taken into account, in the determining, independently of a longitudinal speed of the motor vehicle,
   wherein blocking regions, which must not be traveled in by the motor vehicle, are defined in a space surrounding the motor vehicle on the basis of a longitudinal motion of the motor vehicle and a lateral position of the at least one obstacle, and
   wherein the blocking regions are equipped with additional safety regions that take into account a geometry of the motor vehicle and its possible rotation in the context of a yaw angle conditioned by travel along the collision-avoiding trajectory.

7. The method of claim 6, wherein the attainable lateral position range is at least one of cut off and bounded by the blocking region of the at least one obstacle, so as to result in a passing gate.

8. The method of claim 7, wherein by way of the passing gates, a possible collision-avoiding trajectory is described which is attainable by the motor vehicle in accordance with its predetermined vehicle-dynamics properties, and which leads in collision-free fashion past the at least one obstacle.

9. The method of claim 8, wherein the collision-avoiding trajectory that leads through the passing gates is calculated with the aid of an optimization process, an upper bound and a lower bound of the lateral position range being taken into account in the optimization as a boundary condition.

10. The method of claim 6, wherein the collision-avoiding trajectory is described by at least one of a constant-curvature spline and a polyline having equidistant interpolation points.

11. The method of claim 6, wherein an accelerated motion of at least one of the motor vehicle and of the at least one obstacle is taken into account in determining the collision-avoiding trajectory.

12. The method of claim 6, further comprising:
in the context of the obstacle approaching during driving operation, proposing or performing, by the vehicle control device, a driving maneuver of the motor vehicle for evasion autonomously or semiautonomously, wherein the driving maneuver is based on the determined collision-avoiding trajectory.

13. A method for evading at least one obstacle approaching a motor vehicle by maneuvering the motor vehicle, the method comprising:
determining, by a processor of a vehicle control device, a collision-avoiding trajectory for the driving maneuver of the motor vehicle, so as to evade the at least one obstacle approaching the motor vehicle during a driving operation;
wherein the lateral speed of the motor vehicle is taken into account, in the determining, independently of a longitudinal speed of the motor vehicle, and
wherein the collision-avoiding trajectory is described by at least one of a constant-curvature spline and a polyline having equidistant interpolation points.

14. A method for evading at least one obstacle approaching a motor vehicle by maneuvering the motor vehicle, the method comprising:
determining, by a processor of a vehicle control device, a collision-avoiding trajectory for the driving maneuver of the motor vehicle, so as to evade the at least one obstacle approaching the motor vehicle during a driving operation, wherein the determining includes, for each of a plurality of longitudinal distances from the vehicle, calculating an associated attainable lateral position range of the motor vehicle by taking the lateral speed of the motor vehicle into account independently of a longitudinal speed of the motor vehicle; and
in the context of the obstacle approaching during driving operation, proposing or performing, by the vehicle control device, a driving maneuver of the motor vehicle for evasion autonomously or semiautonomously, wherein the driving maneuver is based on the determined collision-avoiding trajectory.

15. A non-transitory computer readable medium having a computer program, which is executable by a processor, comprising:
a program code arrangement having program code for performing the following:
determining a collision-avoiding trajectory for the driving maneuver of the motor vehicle, so as to evade the at least one obstacle approaching the motor vehicle during a driving operation, wherein the determining includes, for each of a plurality of longitudinal distances from the vehicle, calculating an associated attainable lateral position range of the motor vehicle by taking the lateral speed of the motor vehicle into account independently of a longitudinal speed of the motor vehicle; and
in the context of the obstacle approaching during driving operation, proposing or performing, by a vehicle control device, a driving maneuver of the motor vehicle for evasion autonomously or semiautonomously, wherein the driving maneuver is based on the determined collision-avoiding trajectory.

16. A control device of a driver assistance system, comprising:
a processor; and
a non-transitory computer readable medium having a computer program, which is executable by the processor to perform the following:
determining a collision-avoiding trajectory for the driving maneuver of the motor vehicle, so as to evade the at least one obstacle approaching the motor vehicle during a driving operation, wherein the determining includes, for each of a plurality of longitudinal distances from the vehicle, calculating an associated attainable lateral position range of the motor vehicle by taking the lateral speed of the motor vehicle into account independently of a longitudinal speed of the motor vehicle; and
in the context of the obstacle approaching during driving operation, proposing or performing, by the control device, a driving maneuver of the motor vehicle for evasion autonomously or semiautonomously, wherein the driving maneuver is based on the determined collision-avoiding trajectory.

17. A driver assistance system of a motor vehicle, comprising:
at least one sensing arrangement for detecting obstacles in an area surrounding the motor vehicle; and
a control device, which is connected to the at least one sensing arrangement, including a processor and a non-transitory computer readable medium having a computer program, which is executable by the processor to perform the following:
determining a collision-avoiding trajectory for the driving maneuver of the motor vehicle, so as to evade the at least one obstacle approaching the motor vehicle during a driving operation, wherein the determining includes, for each of a plurality of longitudinal distances from the vehicle, calculating an associated attainable lateral position range of the motor vehicle by taking the lateral speed of the motor vehicle into account independently of a longitudinal speed of the motor vehicle; and
in the context of the obstacle approaching during driving operation, proposing or performing, by the control device, a driving maneuver of the motor vehicle for evasion autonomously or semiautonomously, wherein the driving maneuver is based on the determined collision-avoiding trajectory.

* * * * *

UNITED STATES PATENT AND TRADEMARK OFFICE
CERTIFICATE OF CORRECTION

PATENT NO.        : 8,630,762 B2  
APPLICATION NO. : 12/308636  
DATED             : January 14, 2014  
INVENTOR(S)       : Staempfle et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1156 days.

Signed and Sealed this

Twenty-second Day of September, 2015

Michelle K. Lee
*Director of the United States Patent and Trademark Office*